(12) United States Patent
Nagaya et al.

(10) Patent No.: US 7,758,286 B2
(45) Date of Patent: Jul. 20, 2010

(54) INSERT-INDEXABLE TOOL

(75) Inventors: Hidehiko Nagaya, Joso (JP); Norio Aso, Sarushima-gun (JP); Yasuharu Imai, Shimotsuma (JP)

(73) Assignee: Mitsubishi Materials Corporation, Tokyo (JP)

( * ) Notice: Subject to any disclaimer, the term of this patent is extended or adjusted under 35 U.S.C. 154(b) by 539 days.

(21) Appl. No.: 11/692,641

(22) Filed: Mar. 28, 2007

(65) Prior Publication Data
US 2008/0003068 A1    Jan. 3, 2008

(30) Foreign Application Priority Data
Jun. 30, 2006    (JP) .............................. 2006-181189

(51) Int. Cl.
*B23B 27/08* (2006.01)
*B23B 29/04* (2006.01)

(52) U.S. Cl. ..................... 407/101; 407/109; 407/117

(58) Field of Classification Search ......... 407/101–105, 407/107–111, 117, 46, 50, 91; B23B 27/08, B23B 29/04, 29/12
See application file for complete search history.

(56) References Cited

U.S. PATENT DOCUMENTS

| | | | | |
|---|---|---|---|---|
| 3,296,683 A | * | 1/1967 | Kaiser | 407/92 |
| 3,551,977 A | | 1/1971 | Novkov | |
| 3,708,843 A | * | 1/1973 | Erkfritz | 407/38 |
| 3,775,818 A | * | 12/1973 | Sirola | 407/73 |
| 4,321,846 A | * | 3/1982 | Neamtu | 82/158 |
| 5,112,164 A | | 5/1992 | Pano | |
| 5,288,180 A | | 2/1994 | Hedlund | |
| 5,688,080 A | * | 11/1997 | Hedlund | 407/101 |
| 5,709,508 A | * | 1/1998 | Barazani et al. | 407/101 |
| 5,833,403 A | | 11/1998 | Barazani | |
| 6,139,227 A | * | 10/2000 | Schafer et al. | 407/110 |

(Continued)

FOREIGN PATENT DOCUMENTS

CN    1498147 A    5/2004

(Continued)

OTHER PUBLICATIONS

European Search Report mailed Apr. 9, 2010 for the European Patent Application No. 07004151.2, which corresponds to U.S. Appl. No. 11/680,114, which is related to the current application.

*Primary Examiner*—Boyer D Ashley
*Assistant Examiner*—Sara Addisu
(74) *Attorney, Agent, or Firm*—Leason Ellis LLP

(57) ABSTRACT

An insert-indexable tool includes a holder and a head member having an insert mount seat for clamping an insert. The head member includes a first jaw having a clamping face and a second jaw having a base face, the clamping face and the base face opposing each other to provide an insert mount seat. A clamping screw having a shaft portion and a pressing portion is disposed in a distal portion of the holder and is inclined with respect to an extending direction of the insert mount seat to extend gradually toward an inside of the holder. The holder is provided with a threaded hole engageable with the shaft portion of the clamping screw. The first jaw is provided with a spot facing accommodating the pressing portion of the clamping screw, and a center axis of the spot facing and an axis of threaded hole obliquely intersect each other.

4 Claims, 10 Drawing Sheets

U.S. PATENT DOCUMENTS

| | | |
|---|---|---|
| 6,186,704 B1 | 2/2001 | Hale |
| 7,144,205 B2 * | 12/2006 | Sheffler et al. .............. 407/103 |
| 7,217,068 B2 * | 5/2007 | Oettle ........................ 407/101 |
| 2002/0131829 A1 | 9/2002 | Persson et al. |
| 2004/0247404 A1 * | 12/2004 | Oettle ........................ 407/117 |
| 2007/0177951 A1 * | 8/2007 | Sakamoto et al. ............. 407/40 |

FOREIGN PATENT DOCUMENTS

| | | |
|---|---|---|
| EP | 0312223 | 4/1989 |
| EP | 0417862 | 3/1991 |
| EP | 0526438 A2 | 2/1993 |
| EP | 000576806-0001 | 11/2006 |
| EP | 000576814-0001 | 11/2006 |
| JP | 5192802 A | 8/1993 |
| JP | 2902085 | 3/1999 |
| SU | 1407688 | 7/1988 |
| WO | 00/51768 | 9/2000 |
| WO | WO-02074475 A1 | 9/2002 |

* cited by examiner

INSERT-INDEXABLE TOOL

INCORPORATION BY REFERENCE

The present application claims priority under 35 U.S.C. §119 to Japanese Patent Application No. 2006-181189 filed on Jun. 30, 2006. The content of the application is incorporated herein by reference in its entirety.

BACKGROUND OF THE INVENTION

1. Field of the Invention

The present invention relates to an insert-indexable tool used for grooving, cutting-off, or the like of an object to be machined.

2. Description of Related Art

As an insert-indexable tool used for a grooving operation or a cutting-off operation, an insert-indexable tool is known in which a pair of jaws are formed in an elastically deformable manner at a distal portion of a holder, an insert mount seat is formed by configuring a clamping face provided on one of the pair of jaws and a base face provided on the other of the pair of jaws so as to face each other, the clamping face and the base face are arranged so as to face each other, and an insert having a cutting edge is clamped in the insert mount seat.

An insert-indexable tool, in which an insert mount seat is included in a head member that is detachably attached to a distal portion of a holder, has been proposed in Published Japanese Patent No. 2902085.

In the insert-indexable tool disclosed in the above patent document, the head member configured in a flat plate shape is fixed to a side face of the holder at the distal end thereof, and a clamping screw having a pressing portion to elastically move one of a pair of jaws in a clamping direction is provided.

The holder is provided with a threaded hole into which the clamping screw is screwed, and one of the pair of jaws of the head member is provided with a spot facing. The threaded hole and the spot facing have a common axis, and the common axis is oriented so as to be inclined with respect to intersecting axes of a front face and the side faces of the holder, i.e., so as to be inclined with respect to the clamping direction of the insert mount seat.

In the insert-indexable tool, the insert is clamped by screwing the clamping screw so as to fix the head member while being drawn toward the holder, and by pressing the spot facing by the pressing portion of the clamping screw to elastically move one of the pair of jaws in the clamping direction.

However, in the insert-indexable tool disclosed in the above patent document, because the threaded hole and the spot facing have the common axis, i.e., the axis of the threaded hole and the center axis of the spot facing are configured so as to coincide, the axis of the clamping screw coincides with the center axis of the spot facing when the clamping screw is screwed into the threaded hole; therefore, the contact position between the pressing portion of the clamping screw and spot facing may vary depending on the alignment of the insert, tightening method for the clamping screw, or the like.

For example, when the pressing portion of the clamping screw and spot facing contact at a position near the proximal end portion of the insert mount seat, i.e., at a position remote from the insert, the force of clamping the insert may be less, and a problem may be encountered in that the insert is not firmly fixed.

Moreover, when the pressing portion of the clamping screw and spot facing contact at a position at which a tangential vector of the tightening rotational operation for the clamping screw is oriented away from the holder, one of the pair of jaws may deform so as to be away from the holder when the clamping screw is tightened, and the insert to be clamed may be misaligned.

As stated above, due to the variation in the contact position between the pressing portion of the clamping screw and spot facing, problems are encountered in that the insert is not firmly fixed.

SUMMARY OF THE INVENTION

The present invention was conceived in view of the aforementioned circumstances, and an object thereof is to provide an insert-indexable tool in which variation in a contact position between a spot facing provided in a head member and a pressing portion of a clamping screw is eliminated, and the insert can be reliably clamped.

In order to achieve the above object, the present invention provides an insert-indexable tool including: a holder; and a head member having an insert mount seat by which an insert having a cutting edge is to be clamped, and mounted on a distal portion of the holder, wherein the head member includes a first jaw having a clamping face and a second jaw having a base face, the clamping face and the base face opposing each other so as to constitute the insert mount seat, a clamping screw having a shaft portion and a pressing portion is disposed in the distal portion of the holder in such a manner that, in a view facing toward the distal portion of the holder along an extending direction of the insert mount seat, the clamping screw is inclined with respect to the extending direction of the insert mount seat and extends gradually toward an inside of the holder while extending from the first jaw toward the second jaw, the holder is provided with a threaded hole engageable with the shaft portion of the clamping screw, the first jaw is provided with a spot facing accommodating the pressing portion of the clamping screw, and a center axis of the spot facing and an axis of threaded hole obliquely intersect each other.

According to the insert-indexable tool configured as described above, because the center axis of the spot facing provided in the head member and the axis of threaded hole obliquely intersect each other, the axis of the clamping screw that is screwed into the threaded hole and the center axis of the spot facing do not coincide with each other and obliquely intersect each other. Therefore, when the clamping screw is screwed, the pressing portion of the clamping screw and the spot facing begin to contact each other at a position with a minimum mutual gap, and the pressing portion of the clamping screw and the spot facing are made in contact at appropriate positions thereof in a reliable manner.

Moreover, because the clamping screw is disposed in such a manner that, in a view facing toward the distal portion of the holder along the extending direction of the insert mount seat, the clamping screw is inclined with respect to the extending direction of the insert mount seat and extends gradually toward the inside of the holder while extending from the first jaw toward the second jaw, the holder is provided with the threaded hole engageable with the shaft portion of the clamping screw, and the first jaw of the head member is provided with the spot facing accommodating the pressing portion of the clamping screw, the head member can be fixed while being drawn toward the holder.

In the above insert-indexable tool, the clamping screw may be inclined with respect to the extending direction of the insert mount seat in such a manner that the clamping screw extends gradually away from the distal portion of the holder while extending from the first jaw toward the second jaw.

According to this configuration, because the spot facing 45 provided in the first jaw is disposed so as to be shifted toward the distal portion of the holder, the insert can be firmly fixed when the clamping screw is screwed into, and the head member can be fixed while being drawn toward the holder.

In the above insert-indexable tool, the axis of the threaded hole and the center axis of the spot facing obliquely may intersect each other in a view facing toward the distal portion of the holder along the extending direction of the insert mount seat, and the axis of the threaded hole and the center axis of the spot facing may be in parallel with each other or coincide each other as viewed from a direction perpendicular to both of the extending direction of the insert mount seat and the clamping direction. According to this configuration, the pressing portion of the clamping screw contacts a portion of the spot facing that extends in substantially parallel with the extending direction of the insert mount seat. Therefore, at a position at which the pressing portion of the clamping screw and the spot facing contact each other, a tangential vector of the tightening rotational operation for the clamping screw is oriented so as to substantially coincide with the extending direction of the insert mount seat, and thus the first jaw is not urged away from the holder, and the insert can be reliably clamped.

In the above insert-indexable tool, the head member may include a first mount face and a second mount face extending in directions intersecting each other as viewed in the clamping direction, the distal portion of the holder may include a first receiving face abutting the first mount face and a second receiving face abutting the second mount face, the first receiving face and the second receiving face may be respectively provided with a first fixing threaded hole and a second fixing threaded hole into which fixing screws inserted into the first mount face and the second mount face are screwed, and the head member may be fixed to the holder by the fixing screws. According to this configuration, the head member can be firmly fixed by the fixing screws. Therefore, it is not necessary to fix the head member to the holder by the clamping screw, and the contact position between the pressing portion of the clamping screw and the spot facing can be determined while applying higher priority to the clamped state of the insert.

As described above, according to the present invention, an insert-indexable tool, in which variation in a contact position between a spot facing provided in a head member and a pressing portion of a clamping screw is eliminated, and the insert can be reliably clamped, is provided.

DETAILED DESCRIPTION OF THE INVENTION

Figure 1:
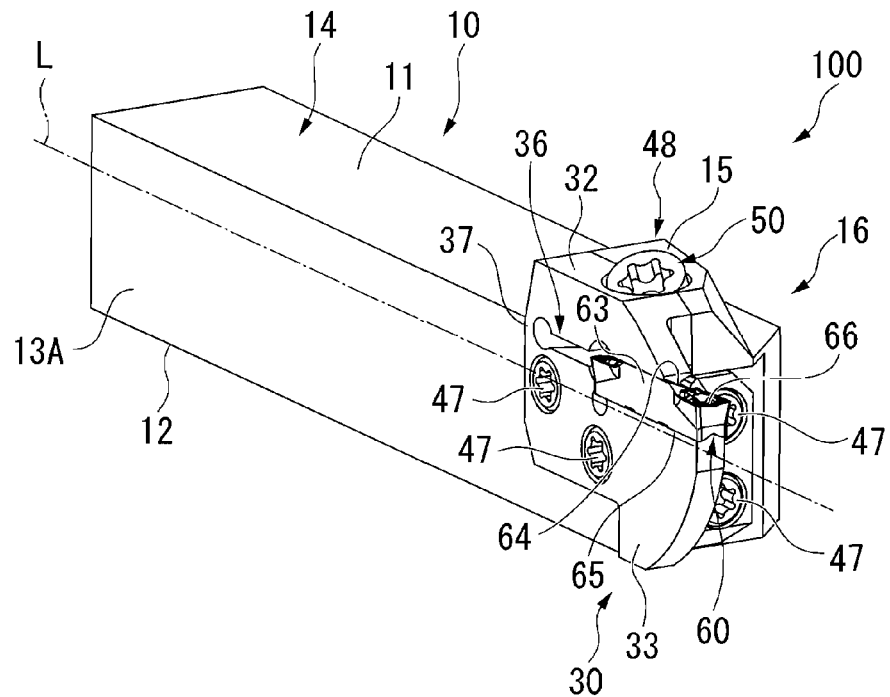
FIG. 1 is a perspective view showing an insert-indexable tool according to a first embodiment of the present invention.

An embodiment of the present invention will be explained below with reference to the appended drawings. An insert-indexable tool 100 according to the first embodiment is shown in FIGS. 1 to 6.

The insert-indexable tool 100 includes a holder 10 having a substantially quadrangular column shape, and a head member 30 which includes an insert mount seat 36 extending from an open end to a connected end and which is mountable on the distal portion of the holder 10. The insert-indexable tool 100 according to an embodiment is a so-called left-hand insert-indexable tool in which, in a view facing toward the open end of the insert mount seat 36 (facing toward the distal portion of the holder 10) along the extending direction of the insert mount seat 36, the head member 30 having the insert mount seat 36 is disposed at a left hand portion of the holder 10.

Figure 2:
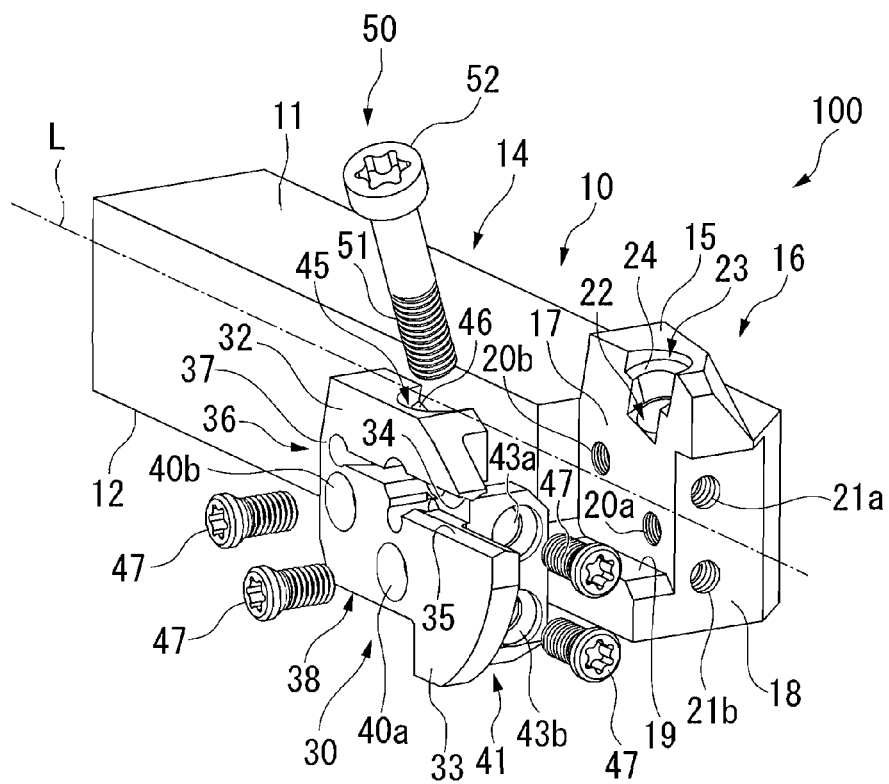
FIG. 2 is an exploded perspective view of the insert-indexable tool shown in FIG. 1.
Figure 3:
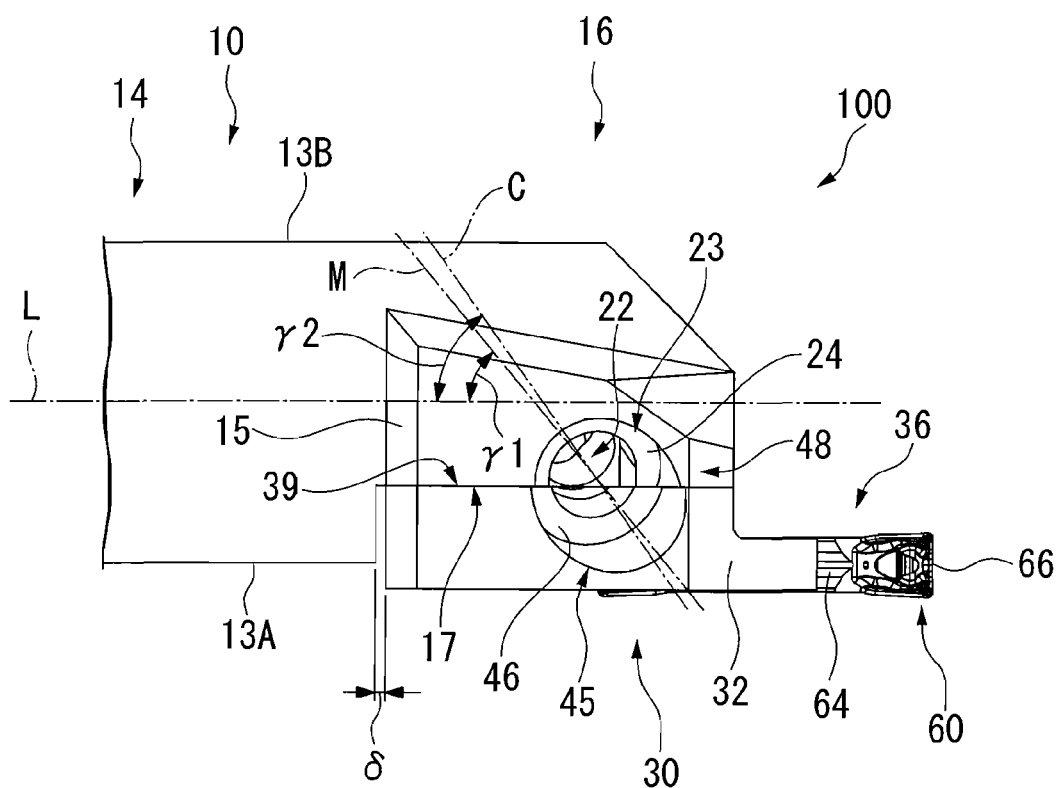
FIG. 3 is a plan view of a holder of the insert-indexable tool shown in FIG. 1.

As shown in FIGS. 1 to 3, the holder 10 is formed in a substantially quadrangular column shape, and includes an upper face 11 and a bottom face 12 arranged oppositely, a first side face 13A (a left side face), and a second side face 13B (a right side face). The proximal portion of the holder 10 (the portion thereof shown in the upper-left in FIGS. 1 and 2) is formed as a shank portion 14 extending along an axis L, and the distal portion of the holder 10 (the portion thereof shown in the lower-right in FIGS. 1 and 2) that includes a projected portion 15 projecting upward from the upper face 11 is designated as a mount portion 16 for mounting the head member 30 that will be separately explained below.

The mount portion 16 includes a first receiving face 17 formed in a planar shape and extending in parallel with the first side face 13A of the holder 10, a second receiving face 18 formed in a planar shape, extending perpendicularly to both of the first receiving face 17 and the axis L, and constituting a distal end face of the holder 10, and a third receiving face 19 formed in a planar shape and perpendicularly intersecting both of the first receiving face 17 and the second receiving face 18.

The first receiving face 17 is configured so as to be stepped from the first side face 13A toward the second side face 13B, and to merge with a surface of the projected portion 15 that is oriented likewise the first side face 13A. The first receiving face 17 is provided with two first fixing threaded holes 20a and 20b extending in the direction perpendicular to the first receiving face 17, which are arranged in such a manner that the first threaded hole 20a located at a distal side of the axis L is located at a lower position, and the first threaded hole 20*b* located at a proximal side of the axis L is located at an upper position.

The second receiving face 18 is arranged so as to intersect a distal portion, as conceived in the direction of the axis L, of the first receiving face 17, and is configured so as to be stepped from a distal end face of the projected portion 15 toward the proximal end. The second receiving face 18 is provided with two second fixing threaded holes 21*a* and 21*b* extending in the direction perpendicular to the second receiving face 18, and the two second fixing threaded holes 21*a* and 21*b* are aligned in the vertical direction of the holder 10.

The third receiving face 19 is disposed between the first receiving face 17 stepped toward the second side face 13B and the first side face 13A, and oriented in a direction perpendicular to the axis L of the holder 10 and in parallel with the first receiving face 17. A distal portion, as conceived in the direction of the axis L, of the third receiving face 19 intersects the second receiving face 18. Accordingly, the second receiving face 18 includes a portion that intersects the first receiving face 17 and a portion that intersects the third receiving face 19, and formed in a substantially L-shape in front view.

The first fixing threaded hole 20*a* located at the distal side of the axis L and the second fixing threaded holes 21*a* and 21*b* are, as conceived in the direction perpendicular to the axis L and in parallel with the first receiving face 17, arranged at positions different from each other. As shown in FIGS. 1 and 2, in this embodiment, the first fixing threaded hole 20*a* is located between the second fixing threaded holes 21*a* and 21*b* that are aligned in the direction perpendicular to the axis L and in parallel with the first receiving face 17.

Figure 4:
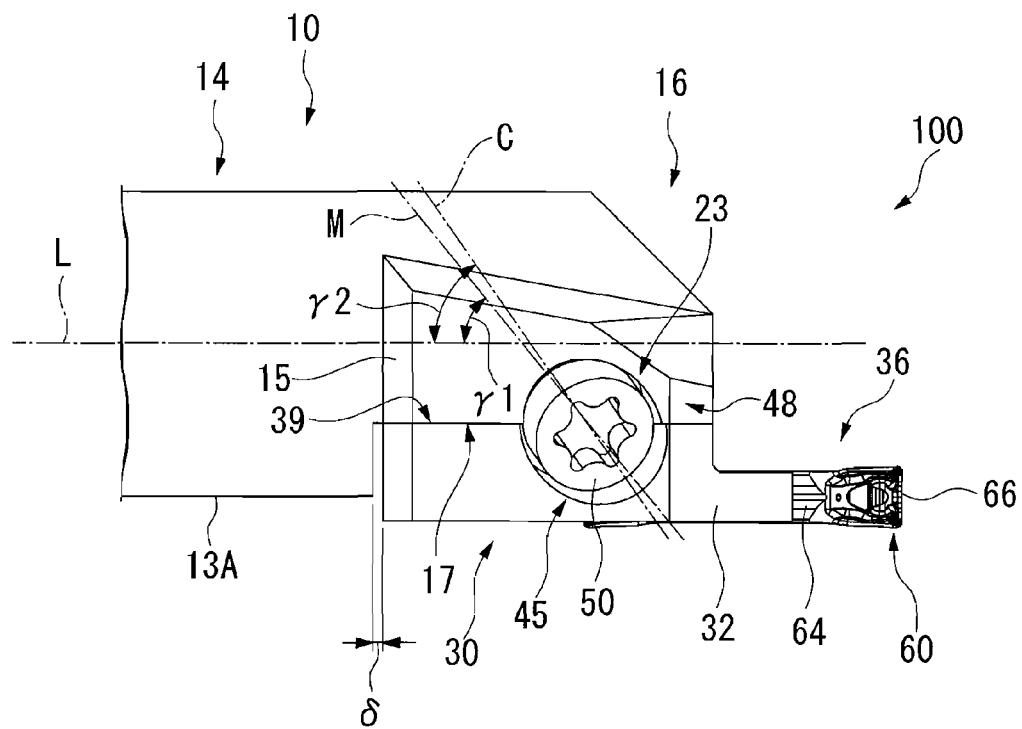
FIG. 4 is a plan view showing the vicinity of an insert mount seat of the insert-indexable tool shown in FIG. 1.
Figure 5:
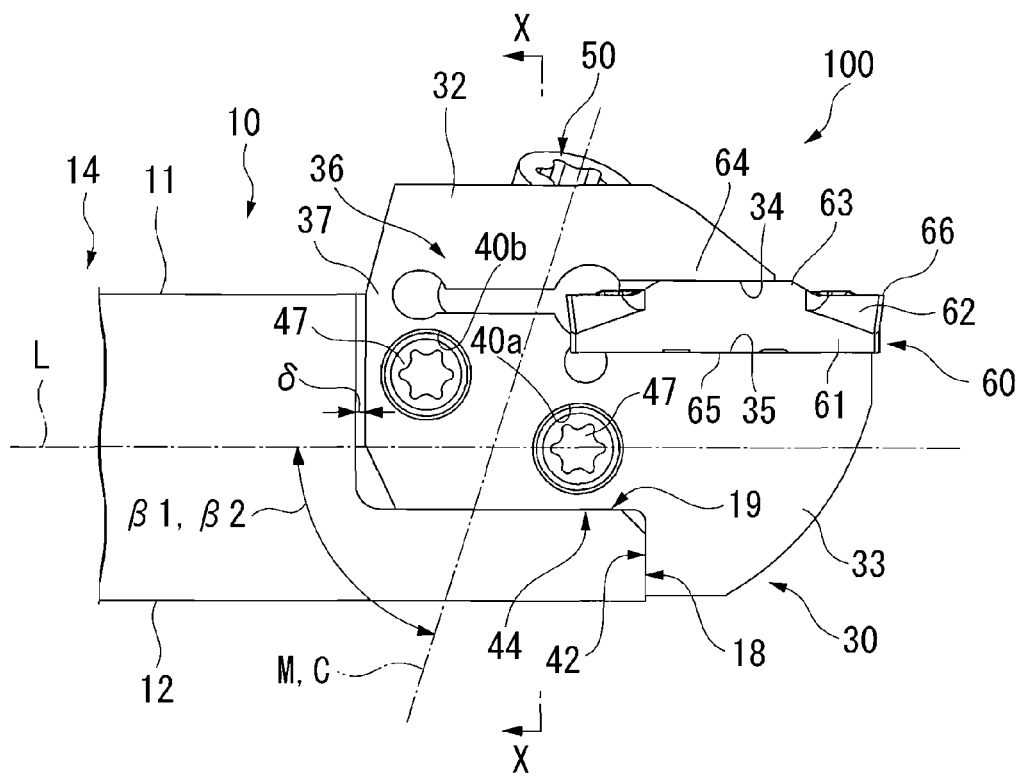
FIG. 5 is a side view showing the vicinity of the insert mount seat shown in FIG. 4.
Figure 6:
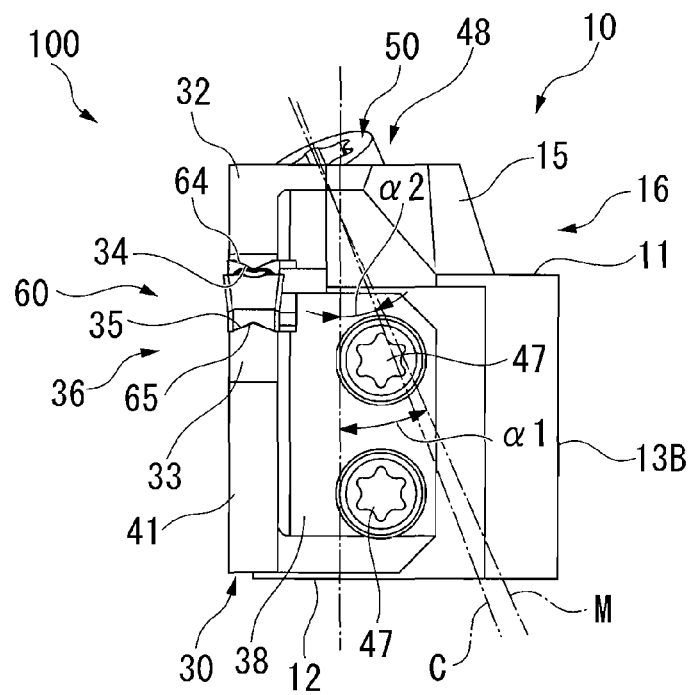
FIG. 6 is a front view showing the vicinity of the insert mount seat shown in FIG. 4.
Figure 7:
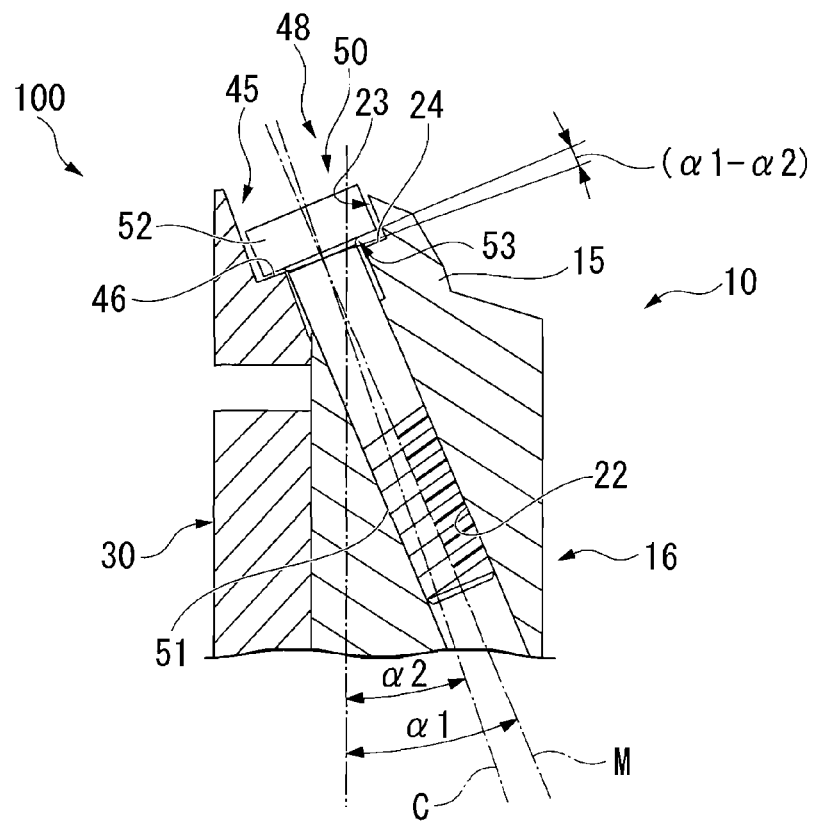
FIG. 7 is a cross-sectional view taken along the line X-X in FIG. 5.

As shown in FIGS. 3 and 7, the projected portion 15 is provided with a clamping threaded hole 22 penetrating from the upper face 11 to the bottom face 12 of the holder 10. The clamping threaded hole 22 is configured in such a manner that an axis M of the clamping threaded hole 22 intersects a line, which extends perpendicularly to the axis L and in parallel with the first receiving face 17, at an angle $\alpha 1$ in a view facing toward the axis L as shown in FIGS. 6 and 7, the axis M intersects the axis L at an angle $\beta 1$ in a view facing toward the first receiving face 17 as shown in FIG. 5, and the axis M intersects the axis L at an angle $\gamma 1$ in a view facing toward the upper face 11 as shown in FIG. 4.

A recess 23 having an opening larger than that of the clamping threaded hole 22 is formed at an upper opening portion of the clamping threaded hole 22, and a portion of the recess 23 that is closest to the first side face 13A opens in the first receiving face 17. Furthermore, a bottom face 24 of the recess 23 is configured so as to perpendicularly intersect the axis M of the clamping threaded hole 22.

Next, the head member 30 that is to be mounted on the aforementioned mount portion 16 will be explained. The head member 30 includes a pair of jaws (an upper jaw 32 and a lower jaw 33) extending from a side face at an end (shown in the upper-left in FIGS. 1 and 2) toward the distal end side (shown in the lower-right in FIGS. 1 and 2), and opening toward the distal end side. The upper jaw 32 is provided with a clamping face 34 that is to downwardly press the insert 60, which will be separately explained below, so that the insert 60 is clamped, and the lower jaw 33 is provided with a base face 35 that is disposed so as to face the clamping face 34. The clamping face 34 and the base face 35 constitute an insert mount seat 36.

The upper jaw 32 is configured so as to elastically move toward the lower jaw 33, i.e., in a clamping direction, while pivoting about a connection portion 37 located between the upper jaw 32 and the lower jaw 33.

In a view facing toward the open end of the insert mount seat 36 along the extending direction of the insert mount seat 36, the base face 35 is configured in an inverted and projected V-shape projecting upward, and the clamping face 34 is configured in a projected V-shape projecting downward.

The upper jaw 32 is configured so that a side face thereof oriented in the other direction has a shape that is substantially the same as that of the surface of the projected portion 15 that is oriented likewise the first side face 13A.

The lower jaw 33 is configured in a rectangular plate shape extending in the direction along which the insert mount seat 36 extends, and in a direction (a clamping direction) along which the clamping face 34 and the base face 35 oppose each other, and a proximal side portion thereof projects toward the other side so that the proximal side portion is thicker than a distal side portion thereof, so that a first plate 38 is configured.

The surfaces of the upper jaw 32 and the lower jaw 33 formed in the first plate 38 and oriented toward the other side are designated as a first mount face 39 that is to be abutted with the first receiving face 17 of the holder 10. The first mount face 39 is shared by the upper jaw 32 and the lower jaw 33; however, the first mount face 39 is formed within a plane.

The first plate 38 is provided with two first insertion holes 40*a* and 40*b* extending perpendicularly to the first mount face 39.

The lower jaw 33 is provided with a second plate 41 projecting from the first mount face 39 toward the other side, and configured in a rectangular plate shape perpendicular to the first mount face 39 and extending in the clamping direction.

The surface of the second plate 41 that is oriented toward the proximal side is designated as a second mount face 42 that is to be abutted with the second receiving face 18 of the holder 10. The second plate 41 is provided with two second insertion holes 43*a* and 43*b* extending perpendicularly to the second mount face 42, and these two second insertion holes 43*a* and 43*b* are aligned in the clamping direction.

The surface of the first plate 38 oriented downward is a plane that perpendicularly intersects both of the first mount face 39 and the second mount face 42, and is designated as a third mount face 44 that is to be abutted with the third receiving face 19 of the holder 10. The third mount face 44 intersects the second mount face 42 in the extending direction of the insert mount seat 36, and the second mount face 42 is configured in substantially an L-shape that is a mirror image of the L-shape of the second receiving face 18.

The upper jaw 32 is provided with a spot facing 45 that opens in the upper face of the upper jaw 32. A portion of the spot facing 45 on the other side opens in the first mount face 39, and a cross-section of the spot facing 45 is configured in substantially a half-circular shape. A bottom face 46 of the spot facing 45 is inclined with respect to the first mount face 39 in such a manner that the bottom face 46 gradually shifts downward as the bottom face 46 extends away from the first mount face 39. The normal of the bottom face 46 is in parallel with a center axis C of the half-circular shape of the spot facing 45. The center axis C intersects the first mount face 39 at an angle $\alpha 2$ in a view facing toward the open end of the insert mount seat 36 along the extending direction of the insert mount seat 36, intersects the extending direction of the insert mount seat 36 at an angle $\beta 2$ in a view facing toward the first mount face 39, and intersects the first mount face 39 at an angle $\gamma 2$ as viewed in the clamping direction.

The head member 30 configured as described above is to be mounted on the mount portion 16 of the holder 10. The head member 30 is placed on the mount portion 16 in such a manner that the first, second, and third mount faces 39, 42, and 44 abut the first, second, and third receiving faces 17, 18, and 19, respectively, the axis L of the holder 10 is arranged in parallel with the extending direction of the insert mount seat 36, and the clamping direction of the insert mount seat 36 is arranged in parallel with the direction perpendicular to the axis L and in parallel with the first receiving face 17.

Fixing screws 47 inserted into the first insertion holes 40a and 40b are screwed into the first fixing threaded holes 20a and 20b, and fixing screws 47 inserted into the second insertion holes 43a and 43b are screwed into the second fixing threaded holes 21a and 21b, thereby the head member 30 is mounted on the holder 10, and the insert mount seat 36 is disposed on the first face 13A (left hand surface) and at the distal portion of the holder 10.

The position of the head member 30 in the direction of the axis L is fixed due to firm contact of the second mount face 42 and the second receiving face 18, and clearance γ is provided between the rear end face of the head member 30 and the holder 10, as shown in FIGS. 4 and 5.

When the upper jaw 32 is abutted with the projected portion 15, the recess 23 of the projected portion 15 is merged with the spot facing 45 of the upper jaw 32, thereby an accommodating portion 48 having a circular cross-section is formed. The axis M of the clamping threaded hole 22 that is formed so as to be perpendicular to the bottom face 24 of the recess 23 and the center axis C of the spot facing 45 respectively intersect the clamping direction at an angle α1 and an angle α2 in a view facing toward the open end of the insert mount seat 36 along the extending direction of the insert mount seat 36, respectively intersect the axis L at an angle β1 and an angle β2 as viewed from the direction perpendicular to both of the direction along which the insert mount seat 36 extends and the clamping direction, and respectively intersect the axis L at an angle γ1 and an angle γ2 as viewed from the clamping direction. In this embodiment, the angles are set so as to satisfy α1>α2, β1=β2, γ1<γ2, and the center axis C of the spot facing 45 and the axis M of the clamping threaded hole 22 obliquely intersect each other.

A clamping screw 50, which is a clamping means for elastically deforming the upper jaw 32 so that the clamping face 34 of the insert mount seat 36 is moved toward the base face 35, is to be screwed into the clamping threaded hole 22. The clamping screw 50 includes a shaft portion 51 having a male thread on the outer surface thereof, and a head portion 52 configured in a cylindrical shape having a diameter greater than that of the shaft portion 51. The surface of the head portion 52 facing the shaft portion 51 is a plane that perpendicularly intersects the axis of the shaft portion 51, and designated as a pressing face 53 that contacts the bottom face 46 (a pressed face) of the spot facing 45. It should be noted that the clamping screw 50 is a so-called right-hand screw that is screwed into by clockwise rotation.

Next, the insert 60 that is to be clamped by the insert mount seat 36 will be explained below. The insert 60 is made of a hard material such as cemented carbide, and includes an insert body 61 configured in substantially a quadrangular rod shape, and cutting edge portions 62 provided at the end portions of the insert body 61. The width of the insert body 61 is constant along the longitudinal direction thereof, and a projection portion 63 is formed on the insert body 61 at a middle portion thereof in lengthwise.

An upper face of the projection portion 63 is designated as a clamped face 64. The clamped face 64 is configured in a concave V-shape that is made concave downwardly so as to be abutted with the clamping face 34. Moreover, a bottom face of the insert body 61 is designated as a seat face 65. The seat face 65 is configured in an inverted concave V-shape that is made concave upwardly so as to be abutted with the base face 35 configured in an inverted convex V-shape.

The cutting edge portions 62 are respectively provided on upper faces of lengthwise end portions of the insert body 61, and a cutting edge 66 extending in the direction perpendicular to the longitudinal direction of the insert body 61 is formed in each of the cutting edge portions 62. The surfaces at the lengthwise ends of the insert body 61 which are respectively connected to the cutting edges 66 are designated as flanks of the cutting edges 66. A positive flank angle is defined to each of the flanks by inclination of the flank in such a manner that the flank extends toward the lengthwise middle portion of the insert body 61 while extending toward the bottom portion of the insert body 61.

A portion of the upper face of the insert 60, which is connected to the cutting edge 66, is designated as a cutting face. The cutting face is configured in a symmetric trapezoid shape in such a manner that the width of the cutting face in plan view is made greater than that of the insert body 61 as the cutting face 67 extends toward the cutting edge 66. In other words, the insert 60 is a so-called dog-bone type insert that is configured to be symmetric about the lengthwise center.

The insert 60 configure as described above is clamped by the insert mount seat 36 of the head member 30 that is mounted on the distal end portion of the holder 10, thereby the insert-indexable tool 100 is configured.

The insert 60 is inserted into the insert mount seat 36, and the insert 60 is seated on the base face 35 while the seat face 65 abuts the base face 35. By screwing the clamping screw 50 toward the holder 10 in this state, the head portion 52 of the clamping screw 50 presses the bottom face 46 (the pressed face) of the spot facing 45 in the upper jaw 32, and the head member 30 is elastically deformed in such a manner that the upper jaw 32 approaches the lower jaw 33 while having therebetween the connection portion 37 as a pivot. As a result, the clamping face 34 of the upper jaw 32 abuts the clamped face 64 of the insert 60, the insert 60 is pressed toward the base face 35, and the insert 60 is clamped and fixed by the base face 35 and the clamping face 34.

The insert-indexable tool 100 configured as described above is supported in a machine tool such as a lathe or a machining center, is moved with respect to a workpiece while the insert 60 is pressed against the workpiece that is rotated at high speed, and thereby cuts an outer peripheral portion or an end portion of the workpiece.

According to the insert-indexable tool 100 of the first embodiment, because the center axis C of the spot facing 45 formed in the upper jaw 32 of the head member 30 and the axis M of the clamping threaded hole 22 formed in the projected portion 15 of the holder 10 obliquely intersect each other, the axis of the clamping screw 50 and the center axis C of the spot facing 45 do not coincide with each other and obliquely intersect each other, as shown in FIG. 7.

In this embodiment, because the axis M of the clamping threaded hole 22 and the center axis C of the spot facing 45 respectively intersect the clamping direction at the angle α1 and the angle α2 in a view facing toward the open end of the insert mount seat 36 along the extending direction of the insert mount seat 36, and the angles are set so as to satisfy α1>α2, the pressing face 53 of the clamping screw 50 intersects the bottom face 46 (the pressed face) of the spot facing 45 at an angle (α1−α2) in a view facing toward the open end of the insert mount seat 36 along the extending direction of the insert mount seat 36, as shown in FIG. 7.

Accordingly, when the clamping screw 50 is screwed, the pressing face 53 of the clamping screw 50 and the bottom face 46 of the spot facing 45 begin to contact and reliably contact each other at a position with a minimum mutual gap.

Figure 8:
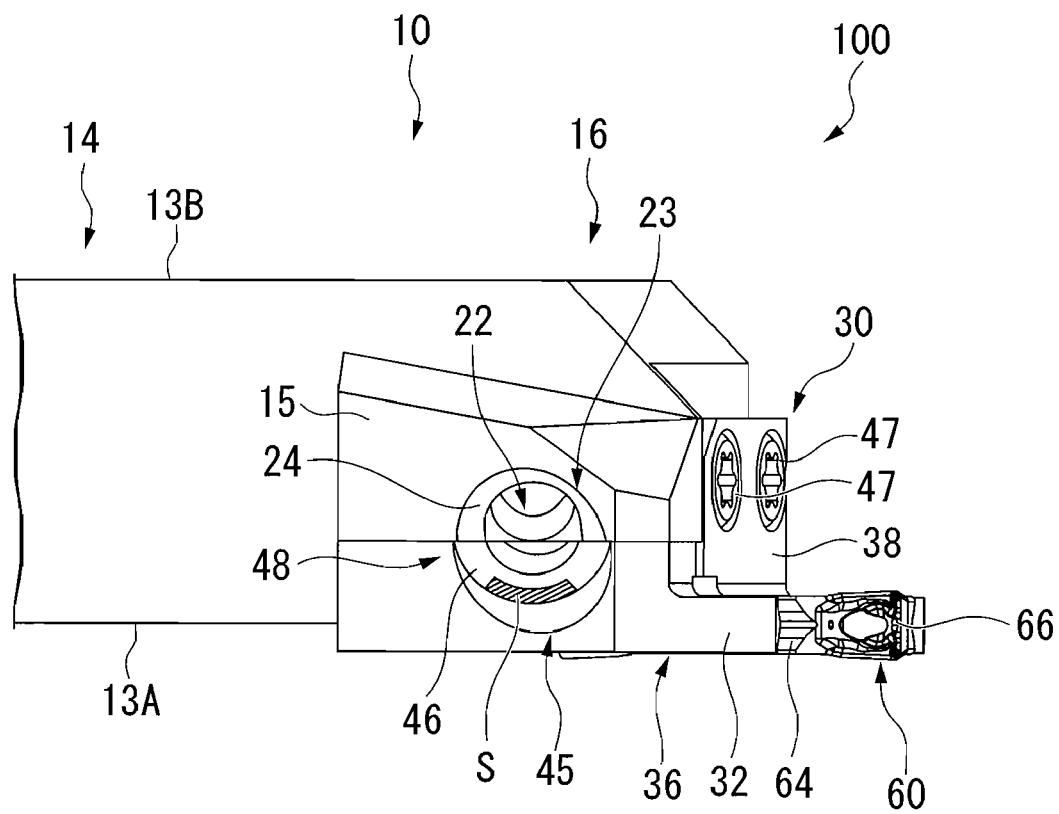
FIG. 8 is a diagram showing the contact portion of a clamping screw at a spot facing in the insert-indexable tool shown in FIG. 1.

Moreover, the axis M of the clamping threaded hole 22 and the center axis C of the spot facing 45 respectively intersect the axis L at the angle β1 and the angle β2 as viewed from the direction perpendicular to both of the extending direction of the insert mount seat 36 and the clamping direction, and the angles β1 and β2 are set to coincide each other, i.e., β1=β2, as shown in FIG. 8, the pressing face 53 of the clamping screw 50 contacts a portion (the hatching portion S in FIG. 8) of the spot facing 45 that extends in substantially parallel with the direction along which the insert mount seat 36 extends. Accordingly, at a position at which the head portion 52 of the clamping screw 50 and the spot facing 45 contact each other, a tangential vector of the tightening rotational operation for the clamping screw 50 is oriented so as to substantially coincide with the direction along which the insert mount seat 36 extends; therefore, the upper jaw 32 is not urged away from the holder 10, and thus the insert 60 can be reliably clamped.

Moreover, because the clamping screw 50 is inclined with respect to the clamping direction in such a manner that the clamping screw 50 extends gradually away from the open end and toward the connected end of the insert mount seat 36 (away from the distal portion of the holder 10) while extending from the upper jaw 32 toward the lower jaw 33, the spot facing 45 is disposed so as to be shifted toward the open end of the insert mount seat 36; therefore, when the clamping screw 50 is screwed into, the insert 60 can be reliably clamped and firmly fixed.

Furthermore, because the head member 30 includes the first mount face 39 and the second mount face 42 intersect each other as viewed in the clamping direction, the holder 10 includes, at the distal portion thereof, the first receiving face 17 abutting the first mount face 39 and the second receiving face 18 abutting the second mount face 42, the first receiving face 17 and the second receiving face 18 are respectively provided with the first fixing threaded holes 20a and 20b and the second fixing threaded holes 21a and 21b into which the fixing screws 47 that are inserted into the first mount face 39 and the second mount face 43 are screwed, and the head member 30 is fixed to the holder 10 by the fixing screws 47, the head member 30 can be firmly held while being drawn toward the proximal end of the holder 10 and toward the second side face 13B. Accordingly, it is not necessary to fix the head member 30 to the holder 10 by the clamping screw 50, and the contact position between the head portion 52 of the clamping screw 50 and the spot facing 45 can be determined while applying higher priority to the clamped state of the insert 60 in the insert mount seat 36, and thus the insert 60 can be reliably clamped.

Moreover, because the first fixing threaded hole 20a located at the distal side of the axis L and the second fixing threaded holes 21a and 21b are, as conceived in the clamping direction, arranged at positions different from each other, the first fixing threaded hole 20a and the second fixing threaded holes 21a and 21b do not interfere each other in the holder 10; therefore, the fixing screws 47 are allowed to be sufficiently long. In addition, by respectively screwing the fixing screws 47 into the first fixing threaded hole 20a located near the distal portion of the holder 10 and into the second fixing threaded hole 21a located near the upper face 11 of the holder 10, the head member 30 can be fixed at positions closer to the insert 60.

Furthermore, because the clamping threaded hole 22 is formed so as to be inclined with respect to the clamping direction, interference between the first fixing threaded holes 20a and 20b and the second fixing threaded holes 21a and 21b can be prevented.

Moreover, because the third receiving face 19 is formed in the mount portion 16 of the holder 10 so as to be oriented in the direction perpendicular to the axis L of the holder 10 and in parallel with the first receiving face 17, and the third mount face 44 that is to be abutted with the third receiving face 19 is formed in the head member 30, the primary component of the cutting force loaded on the insert 60 during a cutting operation can be received by the third receiving face 19; therefore, shifting of the head member 30 due to the cutting force can be prevented, and the cutting operation can be performed with high accuracy.

Moreover, because the third receiving face 19 substantially intersects the second receiving face 18 at a distal portion thereof as viewed from the direction of the axis L, the primary component of the cutting force can be received by the third receiving face 19, and the thrust force can be received by the second receiving face 18. Therefore, shifting of the head member 30 due to the cutting force can be reliably prevented.

Another embodiment of the present invention will be explained below. An insert-indexable tool 200 according to the embodiment is shown in FIGS. 9 to 16. The insert-indexable tool 200 includes a holder 210 having a substantially quadrangular column shape, and a head member 230 which includes an insert mount seat 236 extending from an open end to a connected end and which is mountable on the tip of the holder 210. The insert-indexable tool 200 according to the embodiment is a so-called right-hand insert-indexable tool in which, in a view facing toward the open end of the insert mount seat 236 (facing toward the distal portion of the holder 210) along the extending direction of the insert mount seat 236, the head member 230 having the insert mount seat 236 is disposed at a right hand portion of the holder 210.

Figure 9:
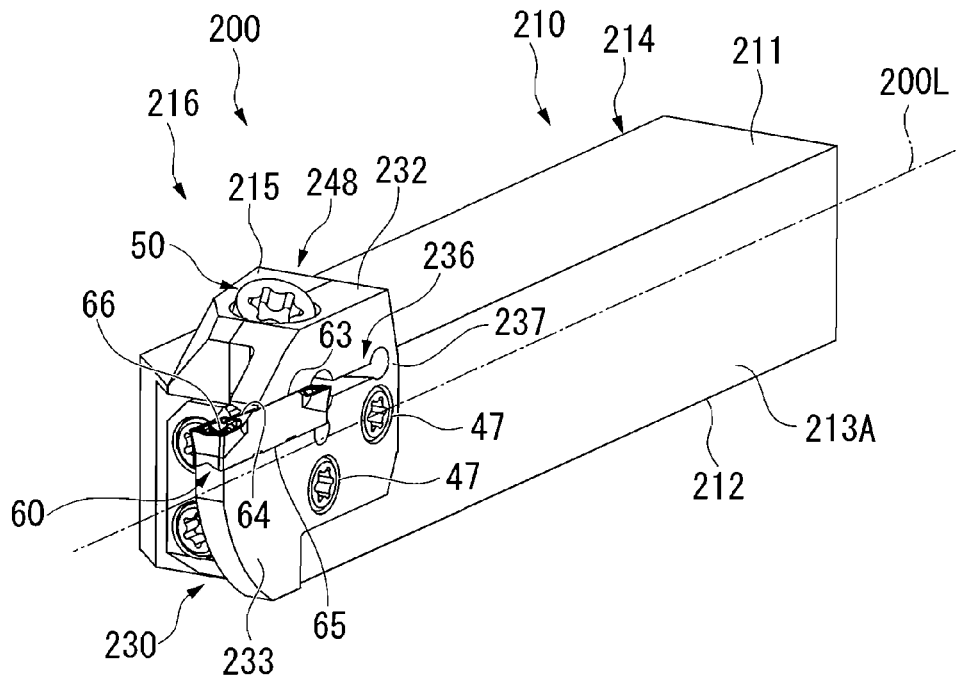
FIG. 9 is a perspective view showing an insert-indexable tool according to a second embodiment of the present invention.
Figure 10:
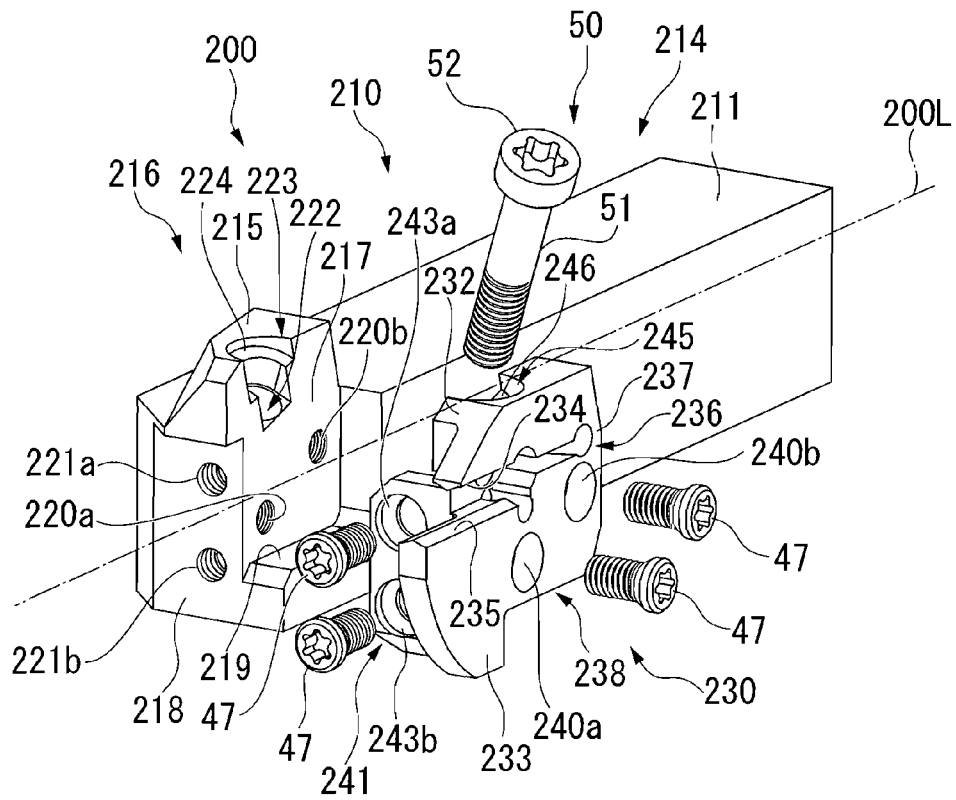
FIG. 10 is an exploded perspective view of the insert-indexable tool shown in FIG. 9.
Figure 11:
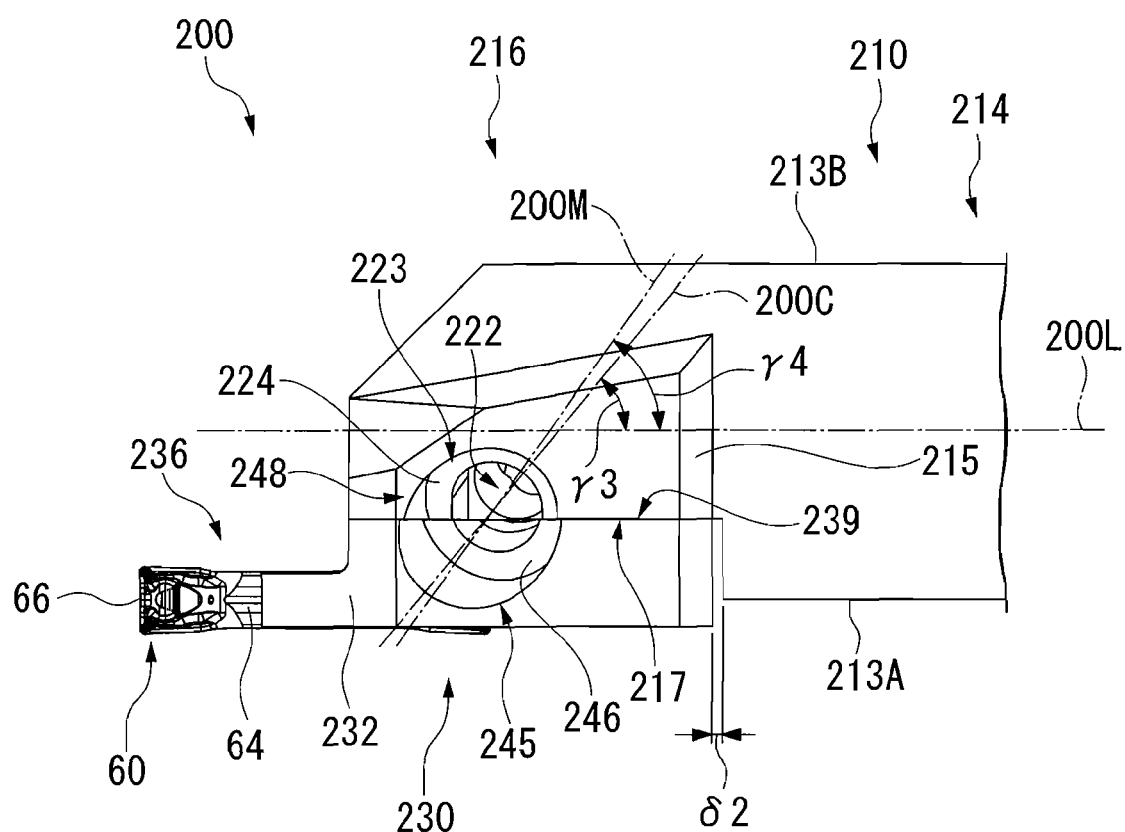
FIG. 11 is a plan view of a holder of the insert-indexable tool shown in FIG. 9.

As shown in FIGS. 9 and 11, the holder 210 is formed in a substantially quadrangular column shape, and includes an upper face 211 and a bottom face 212 arranged oppositely, a first side face 213A (a right side face), and a second side face 213B (a left side face). The proximal portion of the holder 210 (the portion thereof shown in the upper-right in FIGS. 9 and 10) is formed as a shank portion 214 extending along an axis 200L, and the distal portion of the holder 210 (the portion thereof shown in the lower-left in FIGS. 9 and 10) that includes a projected portion 215 projecting upward from the upper face 211 is designated as a mount portion 216 for mounting the head member 230 that will be separately explained below.

Figure 12:
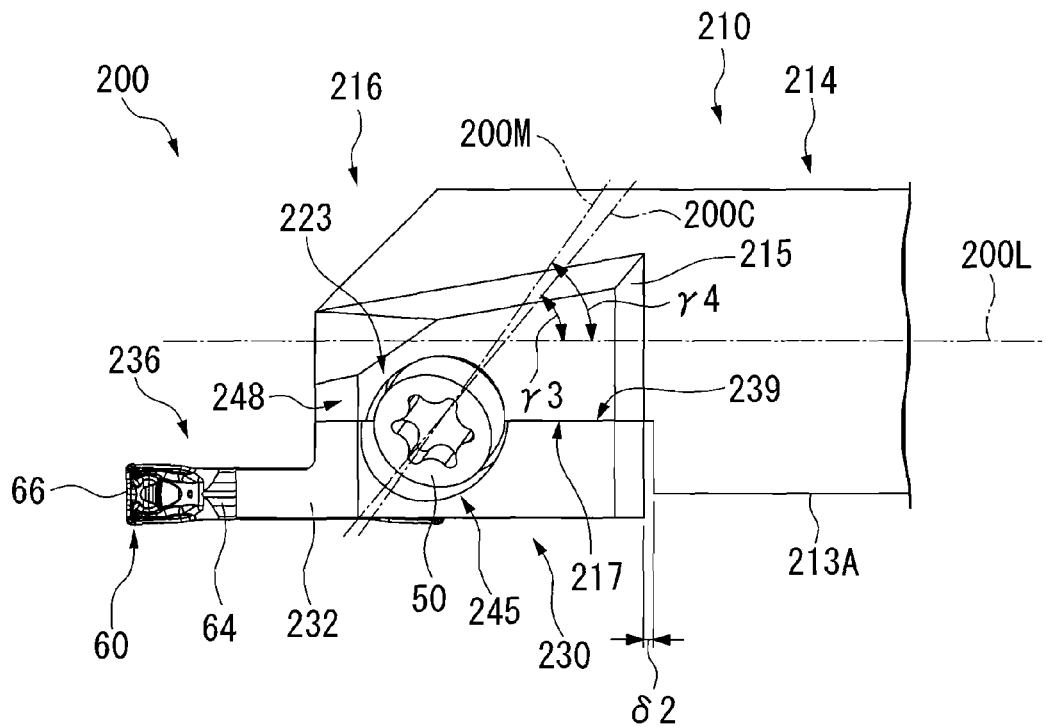
FIG. 12 is a plan view showing the vicinity of an insert mount seat of the insert-indexable tool shown in FIG. 9.
Figure 13:
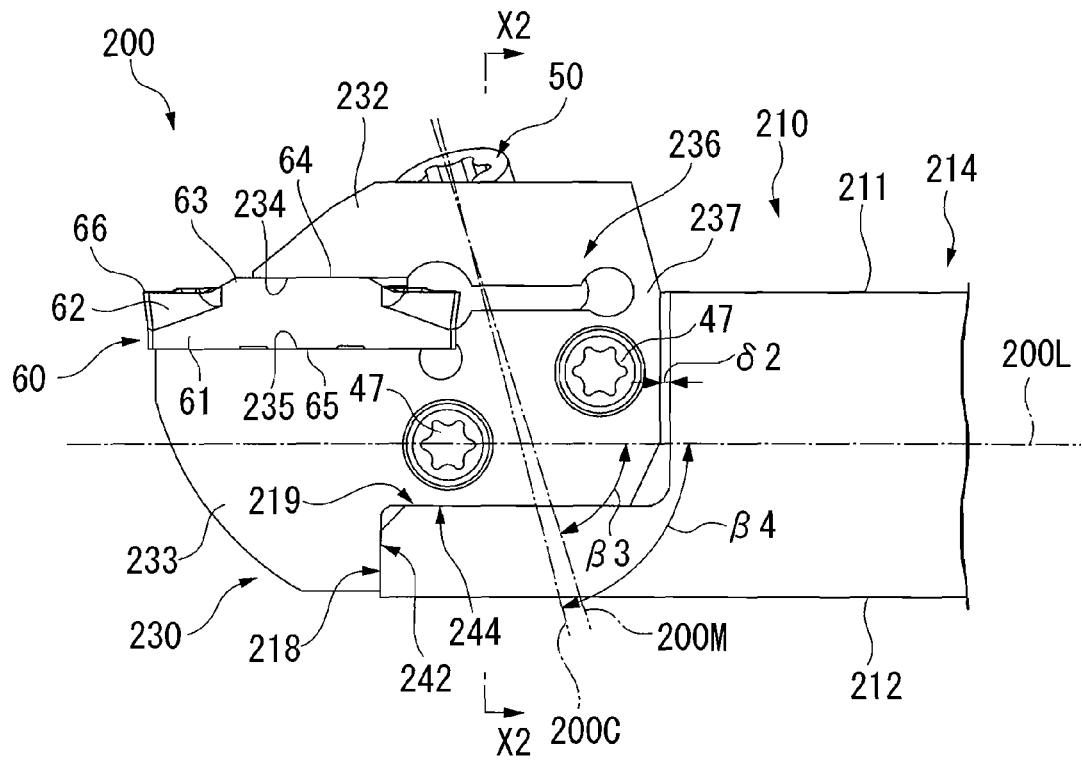
FIG. 13 is a side view showing the vicinity of the insert mount seat shown in FIG. 12.
Figure 14:
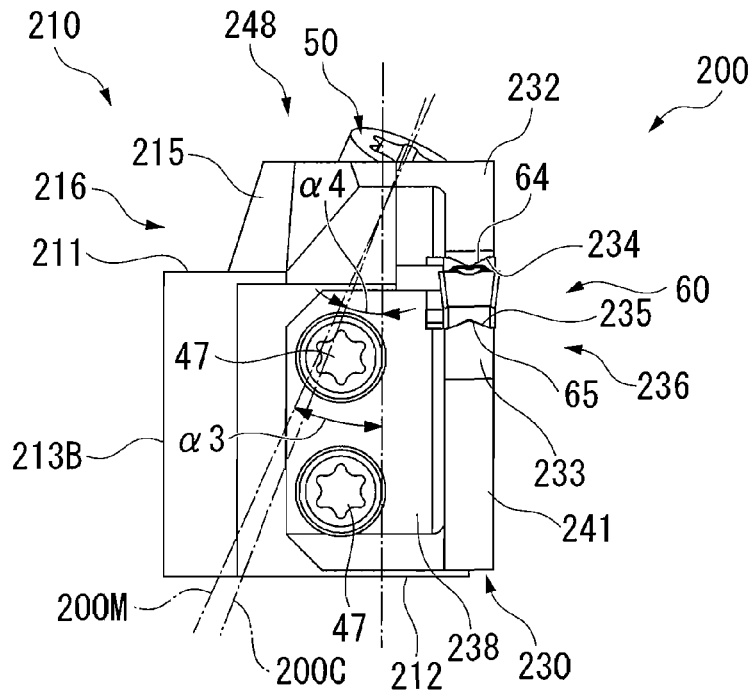
FIG. 14 is a front view showing the vicinity of the insert mount seat shown in FIG. 12.
Figure 15:
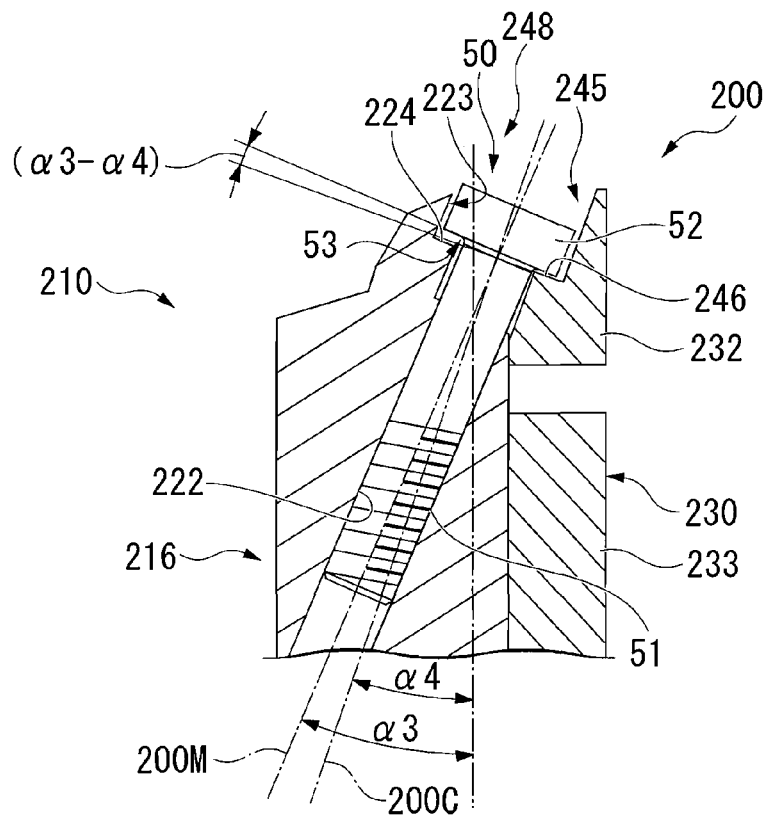
FIG. 15 is a cross-sectional view taken along the line X2-X2 in FIG. 13.

As shown in FIGS. 11 and 15, the projected portion 215 is provided with a clamping threaded hole 222 penetrating from the upper face 211 to the bottom face 212 of the holder 210. The clamping threaded hole 222 is configured in such a manner that an axis 200M of the clamping threaded hole 222 intersects a line, which extends perpendicularly to the axis 200L of the holder 210 and in parallel with the first receiving face 217, at an angle α3 in a view facing toward the axis 200L as shown in FIGS. 14 and 15, the axis 200M intersects the axis 200L at an angle β3 in a view facing toward the first receiving face 217 as shown in FIG. 13, and the axis 200M intersects the axis 200L of the holder 210 at an angle γ3 in a view facing toward the upper face 211 as shown in FIG. 12.

A recess 223 having an opening larger than that of the clamping threaded hole 222 is formed at an upper opening portion of the clamping threaded hole 222, and a portion of the recess 223 that is closest to the first side face 213A opens in the first receiving face 217. Furthermore, a bottom face 224 of the recess 223 is configured so as to perpendicularly intersect the axis 200M of the clamping threaded hole 222.

The head member 230 includes a pair of jaws (an upper jaw 232 and a lower jaw 233) extending from a side face at an end (shown in the lower-right in FIGS. 9 and 10) toward the distal end side (shown in the upper-left in FIGS. 9 and 10), and opening toward the distal end side. The upper jaw 232 is provided with a clamping face 234 that is to downwardly press the insert 60, which will be separately explained below, so that the insert 60 is clamped, and the lower jaw 233 is provided with a base face 235 that is disposed so as to face the clamping face 234. The clamping face 234 and the base face 235 constitute an insert mount seat 236. The upper jaw 232 is configured so as to elastically move toward the lower jaw 233, i.e., in a clamping direction, while pivoting about a connection portion 237 located between the upper jaw 232 and the lower jaw 233.

The upper jaw 232 is provided with a spot facing 245 that opens in the upper face of the upper jaw 232. A portion of the spot facing 245 on the other side opens in the first mount face 239, and a cross-section of the spot facing 245 is configured in substantially a half-circular shape. A bottom face 246 of the spot facing 245 is inclined with respect to the first mount face 239 in such a manner that the bottom face 246 gradually shifts downward as the bottom face 246 extends away from the first mount face 239. The normal of the bottom face 246 coincides with a center axis 200C of the half-circular shape of the spot facing 245. The center axis 200C intersects the first mount face 239 at an angle α4 in a view facing toward the open end of the insert mount seat 236 along the extending direction of the insert mount seat 236, intersects the extending direction of the insert mount seat 236 at an angle β4 in a view facing toward the first mount face 239, and intersects the first mount face 239 at an angle γ4 as viewed in the clamping direction.

The head member 230 is mounted on the mount portion 216 of the holder 210, and the insert mount seat 236 is disposed on the first face 213A (right hand surface) and at the distal portion of the holder 210.

The position of the head member 230 in the direction of the axis 200L is fixed due to firm contact of the second mount face 242 and the second receiving face 218, and clearance δ2 is provided between the rear end face of the head member 230 and the holder 210, as shown in FIGS. 12 and 13.

When the upper jaw 232 is abutted with the projected portion 215, the recess 223 of the projected portion 215 is merged with the spot facing 245 of the upper jaw 232, thereby an accommodating portion 248 having a circular cross-section is formed. The axis 200M of the clamping threaded hole 222 that is formed so as to be perpendicular to the bottom face 224 of the recess 223 and the center axis 200C of the spot facing 245 respectively intersect the clamping direction at an angle α3 and an angle α4 in a view facing toward the open end of the insert mount seat 236 along the extending direction of the insert mount seat 236, respectively intersect the axis 200L at an angle β3 and an angle β4 as viewed from the direction perpendicular to both of the direction along which the insert mount seat 236 extends and the clamping direction, and respectively intersect the axis 200L at an angle γ3 and an angle γ4 as viewed from the clamping direction. In this embodiment, the angles are set so as to satisfy α3>α4, β3<β4, γ3<γ4, and the center axis 200C of the spot facing 245 and the axis 200M of the clamping threaded hole 222 obliquely intersect each other.

A clamping screw 50, which is a clamping means for elastically deforming the upper jaw 232 so that the clamping face 234 of the insert mount seat 236 is moved toward the base face 235, is to be screwed into the clamping threaded hole 222. The clamping screw 50 includes a shaft portion 51 having a male thread on the outer surface thereof, and a head portion 52 configured in a cylindrical shape having a diameter greater than that of the shaft portion 51. The surface of the head portion 52 facing the shaft portion 51 is a plane that perpendicularly intersects the axis of the shaft portion 51, and designated as a pressing face 53 that contacts the bottom face 246 (a pressed face) of the spot facing 245. It should be noted that the clamping screw 50 is a so-called right-hand screw that is screwed into by clockwise rotation.

Figure 16:
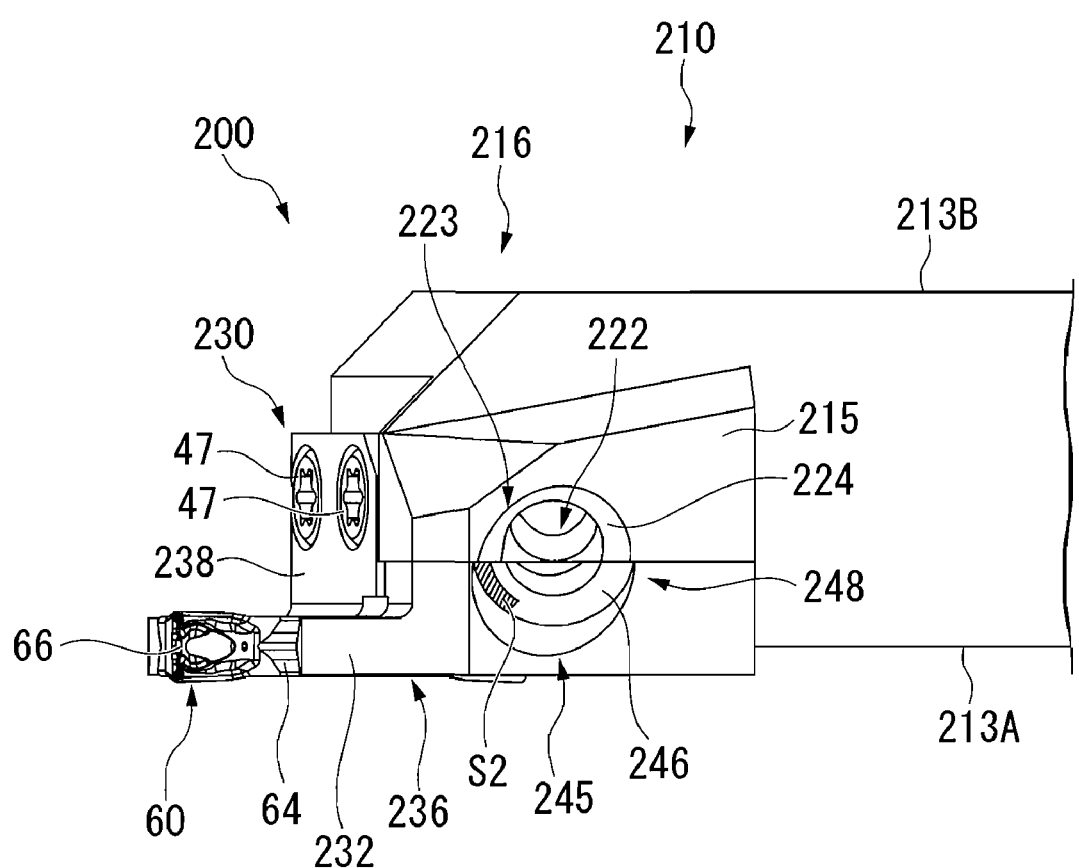
FIG. 16 is a diagram showing the contact portion of a clamping screw at a spot facing in the insert-indexable tool shown in FIG. 9.

According to the insert-indexable tool 200 of this embodiment, the center axis 200C of the spot facing 245 formed in the upper jaw 232 of the head member 230 and the axis 200M of the clamping threaded hole 222 formed in the projected portion 215 of the holder 210 obliquely intersect each other, and more specifically, the center axis 200C and the axis 200M respectively intersect the clamping direction at the angle α3 and the angle α4 in a view facing toward the open end of the insert mount seat 236 along the extending direction of the insert mount seat 236 while the angles are set so as to satisfy α3>α4, and respectively intersect the axis 200L at the angle β3 and the angle β4 as viewed from the direction perpendicular to both of the extending direction of the insert mount seat 236 and the clamping direction while the angles are set so as to satisfy β3<β4; therefore, as shown in FIG. 16, the pressing face 53 of the clamping screw 50 contacts a portion (the hatching portion S2 in FIG. 16) of the spot facing 245 that is located at the distal side of the axis 200L.

Accordingly, at a position at which the head portion 52 of the clamping screw 50 and the spot facing 245 contact each other, a tangential vector of the tightening rotational operation for the clamping screw 50 is oriented toward the holder 210; therefore, the head member 230 can be fixed while the upper jaw 232 is drawn toward the holder 210, and thus the insert 60 can be reliably clamped and firmly fixed.

While the insert-indexable tools according to the embodiments of the present invention have been described above, it should be understood that the present invention is not to be considered as limiting, and various modifications can be made without departing from the technical spirit of the invention.

For example, the description has been made assuming that the clamping screw is configured so that the surface of the head portion facing the shaft portion is a plane that perpendicularly intersects the axis of the shaft portion; however, the configuration is not limited to this, and the surface of the head portion facing the shaft portion may be formed in a tapered shape in which the diameter thereof is gradually reduced while extending toward the shaft portion.

Moreover, the description has been made assuming that the normal of the bottom face of the spot facing is in parallel with the center axis of the spot facing; however, the configuration is not limited to this, and the bottom face of the spot facing may be formed in a tapered shape Moreover, the description has been made assuming that the clamping screw and the spot facing contact at the hatching portion S in FIG. 8 or S2 in FIG. 16; however, the configuration is not limited to this, and the contact position can be appropriately set taking into account cutting conditions, the shape of the holder and the head member, or the like. For example, even of the tool is a left-hand tool, by using a left-hand screw for the clamping screw, and by setting the contact position between the clamping screw and the spot facing to be near the insert mount seat, advantageous effects that are similar to that in the other embodiment can be obtained.

Moreover, the description has been made assuming that the first receiving face and the second receiving face of the holder are perpendicularly intersect each other; however, the configuration is not limited to this, and these faces may be obliquely intersect each other.

Furthermore, the description has been made assuming that both of the base face and the clamping face are configured in a projected V-shape; however, the configuration is not limited to this, and the base face and the clamping face may be configured in a plane shape, or in a concave V-shape.

The shape of the insert is not limited to that described in the embodiments, and other shapes of the insert may be employed.

What is clamed is:

1. An insert-indexable tool comprising:
    a holder; and
    a head member having an insert mount seat by which an insert having a cutting edge is to be clamped, and mounted on a distal portion of the holder, wherein
    the head member includes a first jaw having a clamping face and a second jaw having a base face, the clamping face and the base face opposing each other in a clamping direction so as to constitute the insert mount seat,
    a clamping screw having a shaft portion and a pressing portion that is a plane perpendicularly intersecting an axis of the shaft portion is disposed in the distal portion of the holder in such a manner that, in a view facing toward the distal portion of the holder along an extending direction of the insert mount seat, the clamping screw is inclined with respect to the extending direction of the insert mount seat and extends gradually toward an inside of the holder while extending from the first jaw toward the second jaw,
    the holder is provided with a threaded hole having an axis and engageable with the shaft portion of the clamping screw,
    the first jaw is provided with a spot facing having a center axis and a bottom face perpendicularly intersecting the center axis, and accommodating the pressing portion of the clamping screw, and
    the center axis of the spot facing and the axis of threaded hole obliquely intersect each other in a view facing toward the distal portion of the holder along the extending direction of the insert mount seat in such a manner that an acute angle formed between the clamping direction and the axis of the threaded hole is greater than an acute angle formed between the clamping direction and the center axis of the spot facing.

2. The insert-indexable tool according to claim 1, wherein the clamping screw is inclined with respect to the extending direction of the insert mount seat in such a manner that the clamping screw extends gradually away from the distal portion of the holder while extending from the first jaw toward the second jaw.

3. The insert-indexable tool according to claim 1, wherein the axis of the threaded hole and the center axis of the spot facing are in parallel with each other or coincide each other as viewed from a direction perpendicular to both of the extending direction of the insert mount seat and the clamping direction.

4. The insert-indexable tool according to claim 1, wherein the head member includes a first mount face and a second mount face extending in directions intersecting each other as viewed in the clamping direction,
    the distal portion of the holder includes a first receiving face abutting the first mount face and a second receiving face abutting the second mount face,
    the first receiving face and the second receiving face are respectively provided with a first fixing threaded hole and a second fixing threaded hole into which fixing screws inserted into the first mount face and the second mount face are screwed, and
    the head member is fixed to the holder by the fixing screws.

* * * * *